(12) United States Patent
Wintgens et al.

(10) Patent No.: US 10,519,809 B2
(45) Date of Patent: Dec. 31, 2019

(54) LINER FOR MOUNTING SOCKET OF MAGNESIUM HOUSING OF AIRCRAFT ENGINE

(71) Applicant: PRATT & WHITNEY CANADA CORP., Longueuil (CA)

(72) Inventors: Eric Wintgens, Montreal-Nord (CA); Pierre Samson, Ste-Julie (CA); Catherine B-Morency, Boucherville (CA); Manon Bolduc, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 503 days.

(21) Appl. No.: 15/299,917

(22) Filed: Oct. 21, 2016

(65) Prior Publication Data

US 2018/0112559 A1    Apr. 26, 2018

(51) Int. Cl.
*F02C 7/20* (2006.01)
*F01D 25/28* (2006.01)
(Continued)

(52) U.S. Cl.
CPC ........... *F01D 25/28* (2013.01); *F01D 25/005* (2013.01); *F01D 25/24* (2013.01);
(Continued)

(58) Field of Classification Search
CPC ........ F01D 25/28; F01D 25/005; F01D 25/24; F05D 2220/323; F05D 2240/90
(Continued)

(56) References Cited

U.S. PATENT DOCUMENTS

| 5,511,299 A | 4/1996 | Stockton |
| 5,608,958 A | 3/1997 | Stockton |

(Continued)

FOREIGN PATENT DOCUMENTS

| CN | 203604547 U | 5/2014 |
| EP | 1640626 B1 | 11/2011 |

(Continued)

OTHER PUBLICATIONS

English translation of China patent document No. CN 203604547 dated May 21, 2014; www39.orbit.com/questel . . . .
(Continued)

*Primary Examiner* — Todd M Epps
(74) *Attorney, Agent, or Firm* — Norton Rose Fulbright Canada LLP

(57) ABSTRACT

Assemblies and methods useful for mounting an engine to an aircraft structure are disclosed. An exemplary assembly comprises a body made of a magnesium-based material defining a socket formed therein and a liner disposed in the socket for receiving and interfacing with an engine mounting element of the aircraft. The liner comprises a peripheral side wall and a bottom wall having an outer periphery in sealing engagement with a lower portion of the peripheral side wall. The liner is made of a liner material that provides a galvanic potential between the liner material and a material of the engine mounting element that is lower than a galvanic potential between the magnesium-based material of the body and the material of the engine mounting element.

20 Claims, 4 Drawing Sheets

(51) Int. Cl.
*F01D 25/00* (2006.01)
*F01D 25/24* (2006.01)

(52) U.S. Cl.
CPC .... *F05D 2220/323* (2013.01); *F05D 2240/90* (2013.01); *F05D 2260/37* (2013.01); *F05D 2260/95* (2013.01); *F05D 2300/171* (2013.01); *F05D 2300/173* (2013.01); *Y02T 50/671* (2013.01)

(58) Field of Classification Search
USPC .......... 248/554; 60/796, 797, 798, 799, 802; 416/189
See application file for complete search history.

(56) References Cited

U.S. PATENT DOCUMENTS

| | | | |
|---|---|---|---|
| 6,758,598 | B2 | 7/2004 | Beauvais et al. |
| 7,560,838 | B2 | 7/2009 | van der Woude |
| 8,840,350 | B2 | 9/2014 | Inaba et al. |
| 8,943,840 | B2 | 2/2015 | Williams |
| 9,352,649 | B2 | 5/2016 | Viel et al. |
| 10,378,364 | B2* | 8/2019 | Spangler ................ F01D 5/187 |
| 10,378,374 | B2* | 8/2019 | Suciu ...................... F01D 11/14 |
| 2007/0164087 | A1 | 7/2007 | Payne |
| 2014/0044527 | A1 | 2/2014 | Parkos et al. |
| 2014/0174252 | A1 | 6/2014 | Davis et al. |
| 2014/0314546 | A1 | 10/2014 | Davis et al. |
| 2015/0049967 | A1 | 2/2015 | Fraser et al. |
| 2015/0125661 | A1 | 5/2015 | Sullivan et al. |
| 2016/0017811 | A1 | 1/2016 | Martin et al. |
| 2016/0040538 | A1 | 2/2016 | Chen et al. |
| 2016/0097329 | A1 | 4/2016 | Shmyreva et al. |
| 2016/0123164 | A1* | 5/2016 | Freeman ............... F01D 25/005 415/200 |
| 2016/0146112 | A1 | 5/2016 | Van der Merwe et al. |
| 2016/0153287 | A1 | 6/2016 | Roach et al. |
| 2016/0326893 | A1* | 11/2016 | Baldwin ................. F01D 9/026 |
| 2019/0048441 | A1* | 2/2019 | Wilson ................. F01D 17/165 |

FOREIGN PATENT DOCUMENTS

| | | |
|---|---|---|
| EP | 2834537 B1 | 5/2016 |
| GB | 1190365 | 5/1970 |
| WO | 2015185877 A1 | 12/2015 |

OTHER PUBLICATIONS

English translation of Europe patent document No. EP 2834537 dated May 18, 2016; www39.orbit.com/questel . . . .
English translation of International publication No. WO2015185877 dated Dec. 10, 2015; www.google.ca/patents . . . .

* cited by examiner

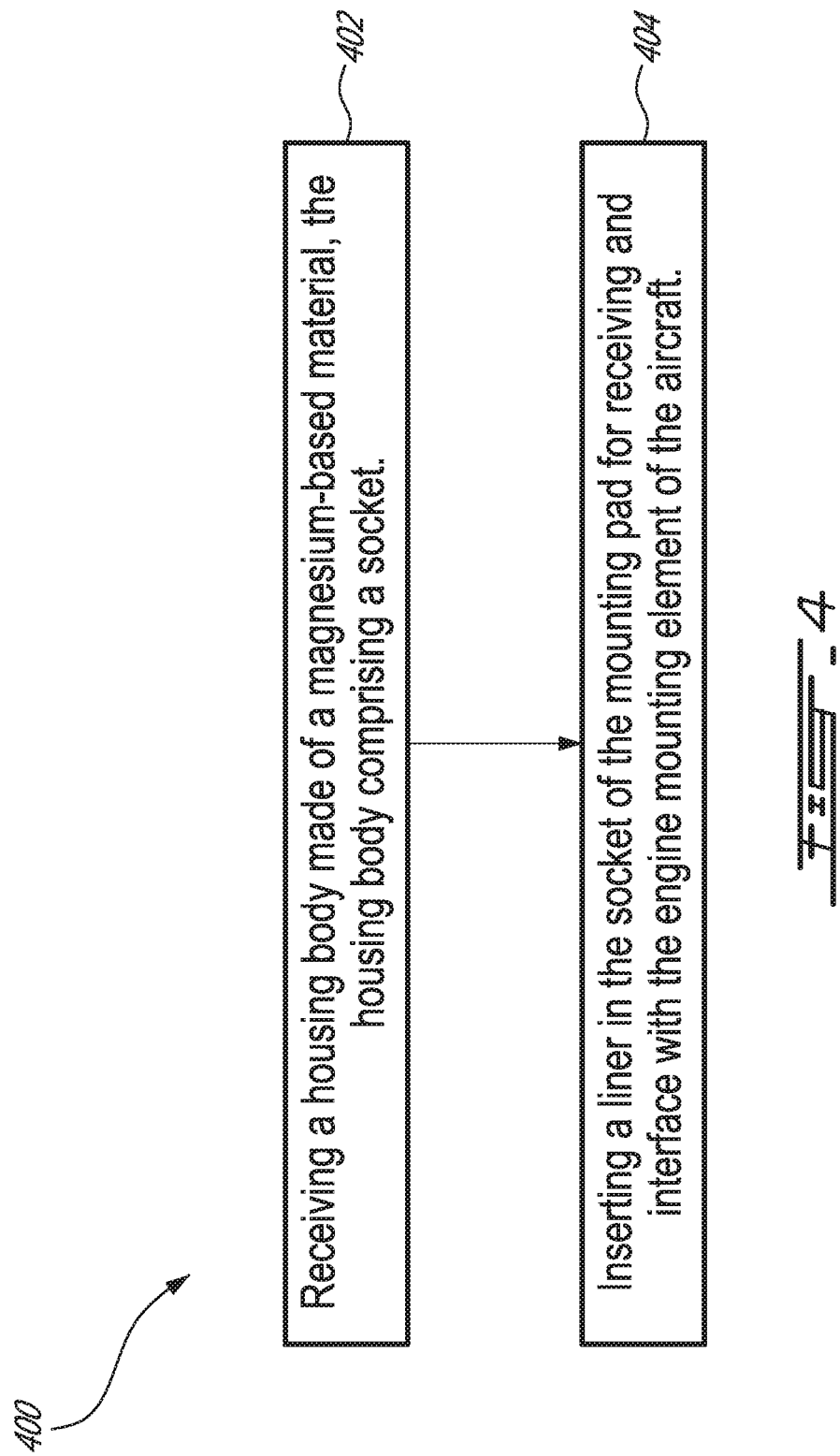

LINER FOR MOUNTING SOCKET OF MAGNESIUM HOUSING OF AIRCRAFT ENGINE

TECHNICAL FIELD

The disclosure relates generally to an aircraft engine and, more particularly, to an engine mount on a magnesium housing of an aircraft engine.

BACKGROUND OF THE ART

The mounting of a gas turbine engine to an aircraft structure may include the use of multiple pins, or dowels that project from the aircraft structure. The engine is hoisted or positioned so that the pins are inserted into matching sockets in an engine housing. Adjacent the sockets and pins are mount pads, flat bosses or lands with internally threaded blind holes to receive fastening bolts that secure the engine to the aircraft structure.

A turbo-prop gas turbine engine includes a reduction gearbox housing that is a relatively large and robust component making the housing suitable for mounting the engine to the aircraft. To reduce engine weight, the gearbox housing is often cast from magnesium alloy which has a relatively high strength to weight ratio and high temperature strength.

The pins are typically made of steel and coatings, paint and sealing compounds can be partially effective in protecting the socket from electro-galvanic corrosion due to the dissimilar metals. However such coatings are subject to wear and since engines are sometimes removed and reinstalled during maintenance activities, the integrity of the coatings can be compromised. Fretting and corrosion can still occur within the sockets since they can be exposed to moisture, salt and abrasive dust particles in operation and during maintenance. Improvement is desirable.

SUMMARY

In one aspect, the disclosure describes a housing of a gas turbine engine of an aircraft. The housing comprises:

a housing body made of a magnesium-based material, the housing body defining a mounting pad comprising a socket; and a liner disposed in the socket for receiving and interfacing with an engine mounting element of the aircraft, the liner comprising a peripheral side wall and a bottom wall having an outer periphery in sealing engagement with a lower portion of the peripheral side wall, the liner being made of a liner material that provides a galvanic potential between the liner material and a material of the engine mounting element that is lower than a galvanic potential between the magnesium-based material of the housing body and the material of the engine mounting element.

The housing may comprise an interference fit between the liner and the socket.

The bottom wall of the liner may comprise a hole formed therethrough to permit venting of the socket when the liner is inserted in the socket.

The housing may comprise a sealant disposed in the hole.

The liner material may be steel.

The liner material may be an aluminum-based material.

The housing may comprise a flange extending outwardly from and being in sealing engagement with an upper portion of the peripheral side wall.

The peripheral side wall, the bottom wall and the flange may have a unitary construction.

Embodiments may include combinations of the above features.

In another aspect, the disclosure describes an assembly useful for mounting an engine to an aircraft structure. The assembly comprises:

a body configured to be secured to the engine, the body being made of a magnesium-based material and defining a socket formed therein; and a liner disposed in the socket for receiving and interfacing with an engine mounting element of the aircraft, the liner comprising a peripheral side wall and a bottom wall having an outer periphery in sealing engagement with a lower portion of the peripheral side wall, the liner being made of a liner material that provides a galvanic potential between the liner material and a material of the engine mounting element that is lower than a galvanic potential between the magnesium-based material of the body and the material of the engine mounting element.

The assembly may comprise an interference fit between the liner and the socket.

The bottom wall of the liner may comprise a hole formed therethrough to permit venting of the socket when the liner is inserted in the socket.

The assembly may comprise a sealant disposed in the hole.

The liner material may be steel.

The liner material may be an aluminum-based material.

The assembly may comprising a flange extending outwardly from and being in sealing engagement with an upper portion of the peripheral side wall.

Embodiments may include combinations of the above features.

In a further aspect, the disclosure describes a method of manufacturing a housing of an aircraft engine where the housing is configured to interface with an engine mounting element of an aircraft. The method may comprise:

receiving a housing body made of a magnesium-based material, the housing body defining a mounting pad comprising a socket; and inserting a liner in the socket of the mounting pad for receiving and interfacing with the engine mounting element of the aircraft, the liner comprising a peripheral side wall and a bottom wall having an outer periphery in sealing engagement with a lower portion of the peripheral side wall.

The liner may be made of a liner material that provides a galvanic potential between the liner material and a material of the engine mounting element that is lower than a galvanic potential between the magnesium-based material of the housing body and the material of the engine mounting element.

The method may comprise inserting the liner in the socket using an interference fit.

The method may comprise forming a venting hole in the bottom wall prior to inserting the liner in the socket.

The method may comprise sealing the hole after inserting the liner in the socket.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a flowchart illustrating method of manufacturing a housing of an engine configured to interface with an engine mounting element of an aircraft.

DETAILED DESCRIPTION

Aspects of various embodiments are described through reference to the drawings.

Figure 1:
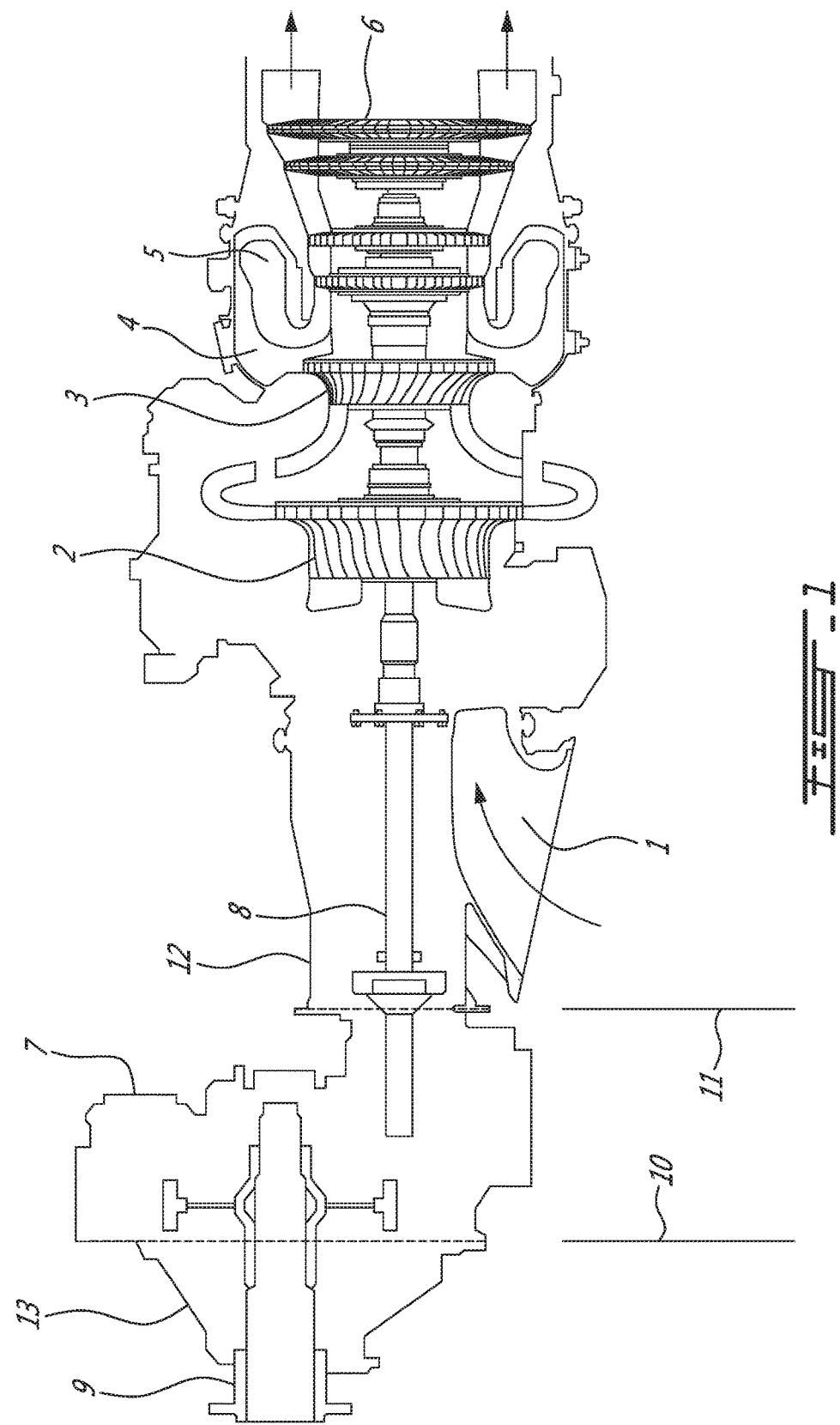
FIG. 1 is a schematic axial cross-sectional view through an exemplary turboprop gas turbine engine with a reduction gearbox between an engine shaft and a propeller shaft.

FIG. 1 shows an axial cross-section through an example turbo-prop gas turbine engine. It will be understood that the invention is equally applicable to other types of aircraft engines such as a turboshaft, turbofan, or auxiliary power units.

Air intake into the engine enters the inlet 1 and is ducted through the low-pressure centrifugal compressor 2 and high-pressure centrifugal compressor 3. Compressed air exits the compressor 3 and is contained within a plenum 4 that surrounds the combustor 5. Fuel is supplied to the combustor 5 and fuel is mixed with air from the plenum 4 when sprayed through nozzles into the combustor 5 as a fuel-air mixture is ignited. Compressed air within the plenum 4 is admitted into the combustor 5 through orifices in the side walls of combustor 5 to mix with the hot gases from the combustor and pass over the turbines 6 before exiting an aft portion of the engine as exhaust.

FIG. 1 shows the location of the reduction gearbox housing 7 between the engine shaft 8 and the propeller shaft 9. The reduction gearbox inside of housing 7 may drivingly couple engine shaft 8 to propeller shaft 9 in a suitable manner. The housing 7 includes forward and rearward planar flange surfaces 10, 11 (best seen in FIG. 2) by which the housing 7 is secured to the cold section 12 of the gas turbine engine and is secured to the propeller shaft housing 13.

Figure 2:
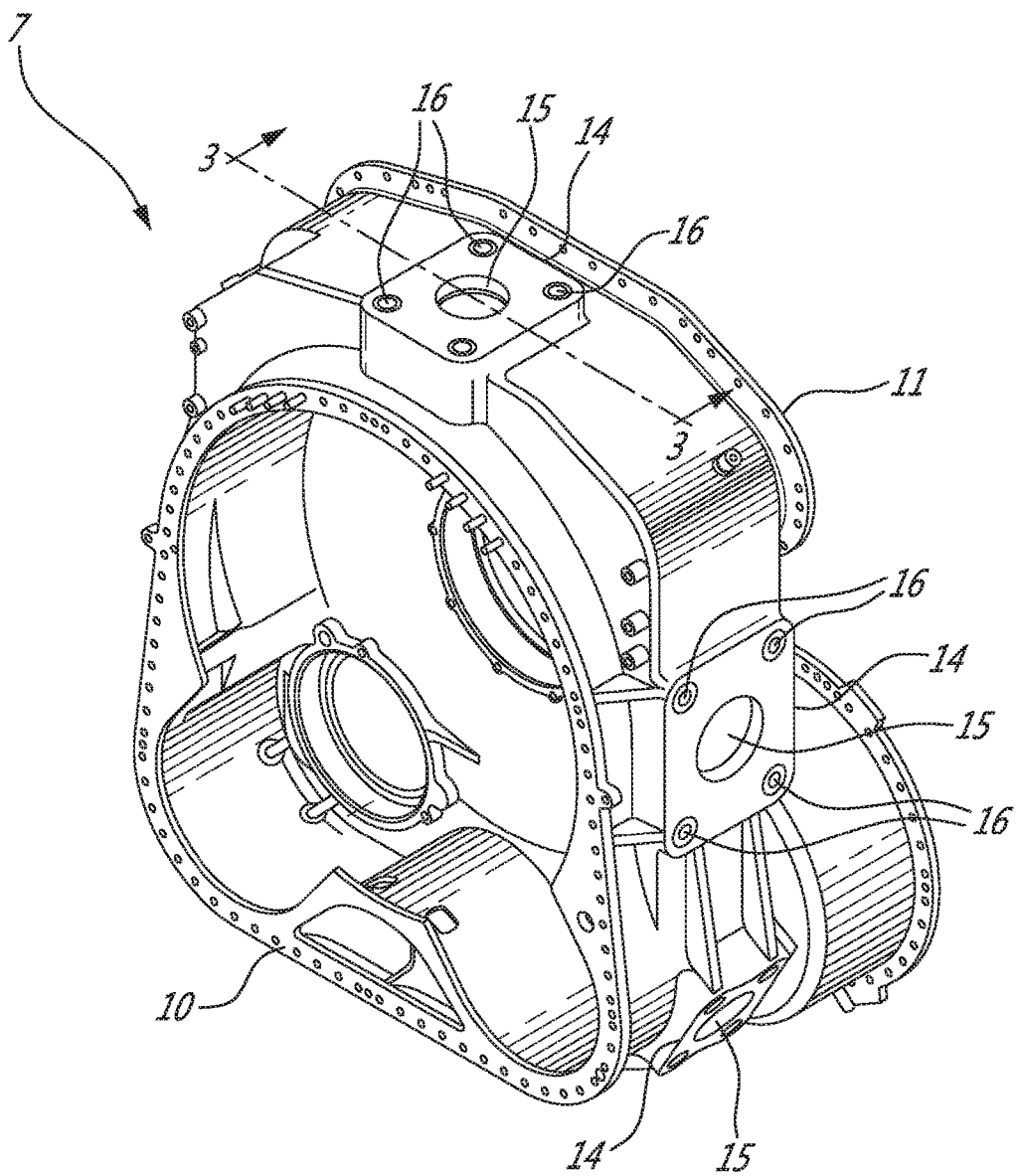
FIG. 2 is a perspective view of an exemplary housing of the reduction gearbox comprising mounting pads with sockets and outer threaded blind holes for mounting the housing (and engine) to a structure of an aircraft.

Referring to FIG. 2, the gearbox housing 7 includes one or more mounting pads 14 that each present a flat boss or land useful for mounting the housing 7 (and hence the engine) to an aircraft structure using one or more suitable engine mounting elements such as pin 25 (shown in FIG. 3), spigot(s), or dowel(s). Each mount pad 14 has a (e.g., central) mounting socket 15 and four outer threaded blind holes 16 within which mounting bolts (not shown) are fastened to secure the housing 7 to the aircraft structure.

Figure 3:
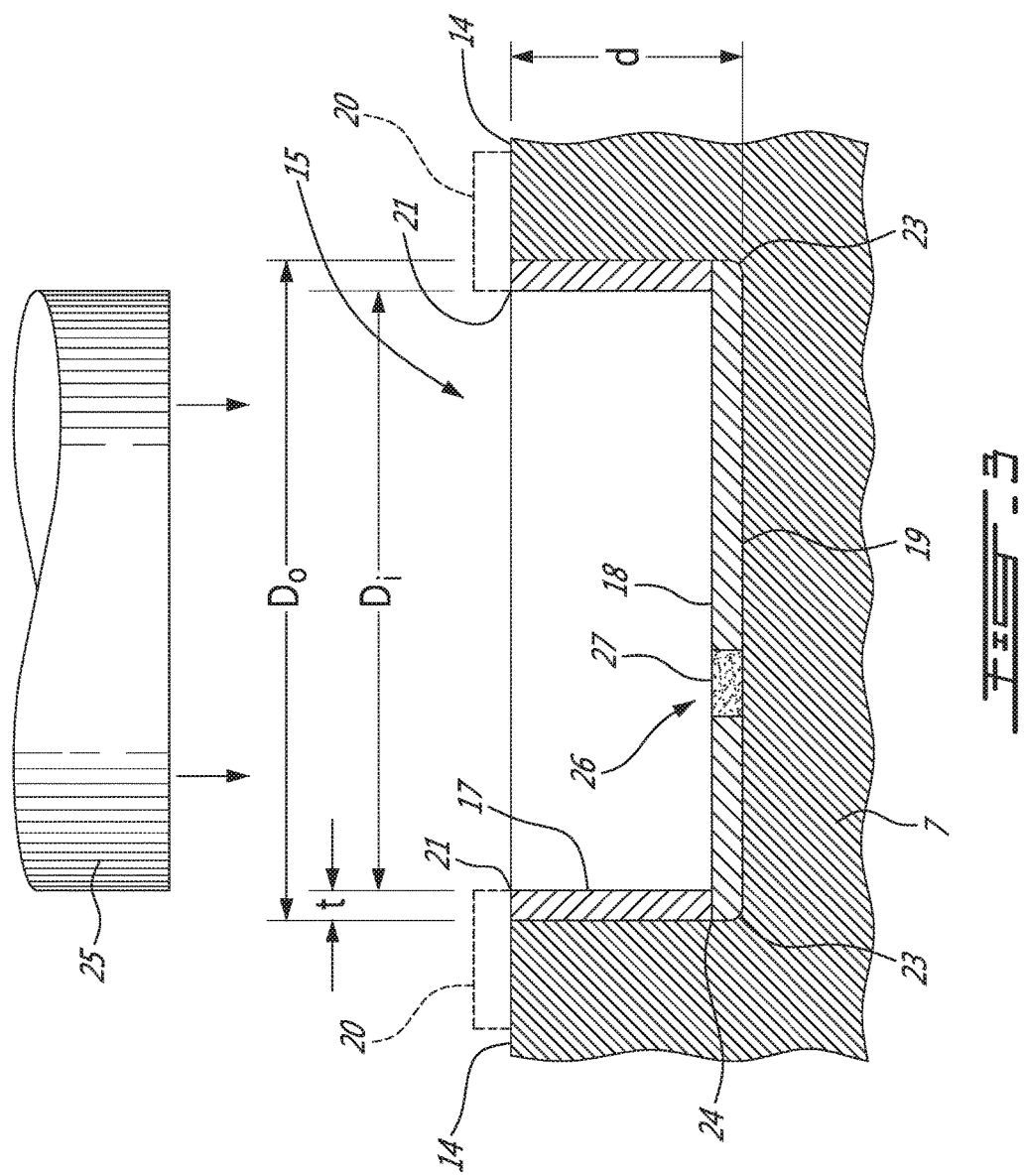
FIG. 3 is a cross-sectional view through a mounting pad of FIG. 2 along line 3-3 of FIG. 2 showing a liner inserted in the socket.

FIG. 3 shows a cross-sectional view through an exemplary socket 15 along line 3-3 of FIG. 2. To protect the magnesium material of the body of housing 7 into which the socket 15 is formed (e.g., cast and/or machined), a protective liner may be installed inside of socket 15. The protective liner may provide fretting protection and also protection against galvanic corrosion between the housing 7 and the mounting pin 25. For example, the liner may provide an interface between the housing 7 and the mounting pin 25 where load transfer between the pin 25 and the housing 7 may be established via the liner. In various embodiments, the mounting pin 25 of the aircraft structure may be made of a suitable steel. In various embodiments, the housing 7 may be made of a suitable magnesium-based material (e.g., alloy).

In various embodiments, the liner may be made of a suitable metallic material. For example, in some embodiments, the liner may be made of a suitable steel. In some embodiments, the liner may be made of a suitable aluminum-based material (e.g., alloy). In various embodiments, the liner material may be selected to provide a galvanic potential between the liner material and the material of the mounting pin 25 that is lower than a galvanic potential that would otherwise be present between the magnesium-based material of the housing 7 and the material (e.g., steel) of the mounting pin 25 in the absence of the liner.

In some embodiments, the liner may comprise a protective (e.g., aluminum-alloy) peripheral side wall 17 and optionally also a protective (e.g., aluminum-alloy) bottom wall 18 which may offer some protection to the base 19 of the socket 15. In some embodiments, bottom wall 18 may be disc-shaped. The peripheral side wall 17 may have a tubular configuration (e.g., a cylindrical sleeve). In some embodiments, the peripheral side wall 17 may have an annular cross-sectional profile. In some embodiments, the peripheral side wall 17 may have a generally circular outer cross-sectional profile but it is understood that the peripheral side wall 17 could have an outer cross-sectional profile of another shape.

The peripheral side wall 17 and bottom wall 18 can be manufactured separately and subsequently bonded, or can be machined as a single piece from a single blank of aluminum. For example, the peripheral side wall 17 and bottom wall 18 may be integrally formed in any suitable manner to have a unitary construction. In some embodiments, the peripheral side wall 17 in combination with the bottom wall 18 may define cup-shaped liner for insertion into socket 15. In other words, the peripheral side wall 17 and the bottom wall 18 may define a capped liner.

Optionally, the liner may include a protective flange 20 extending laterally (e.g., radially outwardly) from and in sealing engagement with an upper portion 21 (e.g., upper edge) of the peripheral side wall 17. The aluminum flange 20 may offer some protection to the top surface of the magnesium mounting pad 14 from corrosion, fretting, moisture and abrasion. Similarly, the peripheral side wall 17, bottom wall 18 and flange 20 may, in some embodiments, be integrally formed in any suitable manner (e.g., cast and/or machined) to have a unitary construction.

Manufacturing of magnesium housing 7 may include casting the magnesium housing 7 with a recessed mount socket 15 and/or machining the socket 15, flat mount pad 14 and the internally threaded blind holes 16 subsequently. As indicated in FIG. 3, the socket 15 has an internal diameter "Do" and a depth "d" defined between the socket base 19 and the flat surface of the mount pad 14. The socket liner may be made up of the peripheral side wall 17 and bottom wall 18 and when the housing 7 is mounted to the aircraft structure, the socket liner is disposed between the mount socket 15 and the engine mount pin 25. Accordingly, the engine mount pin 25 may be received in the liner so that the peripheral side wall 17 may serve as an interface between the engine mount pin 25 and the socket 15.

The socket liner includes the peripheral side wall 17 which may have a wall thickness "t" and an outer diameter substantially equal to the internal diameter "Do" of the socket 15 depending on the fit between the peripheral side wall 17 and the in internal diameter of the socket 15. In some embodiments, there may be a clearance between the outer diameter of the peripheral side wall 17 and the internal diameter Do of the socket 15. In some embodiments, the peripheral side wall 17 may be press fit into the socket 15 by way of a suitable interference fit or can be secured in socket with a sealant to prevent moisture and particle penetration between the peripheral side wall 17 and housing 7. In various embodiments, the outer dimension (e.g., diameter) of the peripheral side wall 17 may be configured to permit the peripheral side wall 17 to be received in the socket 15.

In various embodiments, the inner diameter "Di" of the peripheral side wall 17 may be greater than or substantially the same size as an outer diameter of the engine mounting pin 25. In various embodiments, the inner dimension of the peripheral side wall 17 may be configured to permit the mounting pin 25 to be received in the peripheral side wall 17.

The liner may be installed in the socket 15 so that the bottom wall 18 may be disposed near or against the socket base 19. The bottom wall 18 may have an outer periphery 23 in sealing engagement with a lower portion 24 (e.g., lower edge) of the peripheral side wall 17. Optionally the socket liner can include a flange 20 extending laterally from and in sealing engagement with the upper portion 21 of the peripheral side wall 17. The peripheral side wall 17, bottom wall 18 and flange 20 may be integrally machined from an aluminum blank or separately manufactured then sealed together and installed in the socket 15 of the magnesium housing 7.

When the liner (e.g., comprising the peripheral side wall 17, bottom wall 18 and flange 20) is press-fitted into the socket 15 by a suitable interference fit, the liner may serve as an interface between the magnesium-based material of the housing 7 and the steel of the engine mounting pin 25. The use of the liner may, in some embodiments, provide some protection of the mount socket 15 from corrosion, fretting, moisture penetration and/or abrasive particle accumulation.

In some embodiments, a hole 26 may be formed though the bottom wall 18 to permit venting of the socket 15 when the liner is inserted in the socket 15 by press fitting. The use of the venting hole 26 may facilitate the installation of the liner in the socket 15. In some embodiments, the hole 26 may be sealed using suitable sealing means after installation of the liner into the socket 15 to substantially prevent the ingress of moisture between the liner and the socket 15. In some embodiments, the sealing means may comprise a suitable sealant 27 (e.g., sealing compound) disposed into the hole 26 to occlude the hole 26. In some embodiments, the sealant 27 may be a fluorosilicone adhesive.

FIG. 4 is a flowchart illustrating a method 400 of manufacturing a magnesium housing 7 for a gas turbine engine for an aircraft having an engine mounting pin 25. In various embodiments, method 400 may comprise: receiving the magnesium housing 7 defining a mounting pad 14 comprising a socket 15 for receiving the mounting pin 25 (see block 402); and inserting a liner (e.g., peripheral side wall 17) inside the socket 15 for receiving and interfacing with the mounting pin 25 (see block 404).

In some embodiments, the liner may include the peripheral side wall 17 and the bottom wall 18. In some embodiments, the liner may include the peripheral side wall 17 in combination with the bottom wall 18 and/or the flange 20.

In some embodiments, method 400 may be carried out as a repair procedure using a magnesium housing 7 that has already been in service. Alternatively, method 400 may be carried out using a new magnesium housing 7 that has not yet been in service.

As explained above, the magnesium housing 7 may be a gearbox housing comprising a body that is made of a suitable magnesium-based material and that is secured to the aircraft engine. The socket 15 may have an internal dimension and a depth defined between a socket base 19 and the mounting pad 14. The liner may comprise a peripheral side wall 17 having an inner dimension configured to permit the mounting pin 25 to be received in the peripheral side wall 17 and an outer dimension configured to permit the peripheral side wall 17 to be received in the socket 15 (e.g., by press-fitting). The liner may also comprise a bottom wall 18 disposed adjacent the socket base 19. The bottom wall may have an outer periphery in sealing engagement with a lower portion 24 of the peripheral side wall 17. The peripheral side wall 17 and the bottom wall 18 may be made of a liner material that provides a galvanic potential between the liner material and a mounting pin material that is lower than a galvanic potential that would otherwise be present between the magnesium-based material and the mounting pin material in the absence of the liner.

In some embodiments, the liner may include a flange 20 extending laterally (e.g., radially outwardly) from and in sealing engagement with an upper portion 21 of the peripheral side wall 17.

Method 400 may comprise inserting the liner in the socket 15 using an interference fit.

Method 400 may comprise forming a venting hole 26 in the bottom wall 18 prior to inserting the liner in the socket 15.

Method 400 may comprise sealing the hole 26 after inserting the liner in the socket 15. In some embodiments, the hole 26 may be sealed using a sealant. In some embodiments, the sealant may be a suitable fluorosilicone adhesive.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the housings, liners and assemblies disclosed and shown herein may comprise a specific number of elements/components, the housings and liners could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A housing of a gas turbine engine of an aircraft, the housing comprising:
   a housing body made of a magnesium-based material, the housing body defining a mounting pad comprising a socket; and
   a liner disposed in the socket for receiving and interfacing with an engine mounting element of the aircraft, the liner comprising a peripheral side wall and a bottom wall having an outer periphery in sealing engagement with a lower portion of the peripheral side wall, the liner being made of a liner material that provides a galvanic potential between the liner material and a material of the engine mounting element that is lower than a galvanic potential between the magnesium-based material of the housing body and the material of the engine mounting element.

2. The housing of claim 1, comprising an interference fit between the liner and the socket.

3. The housing of claim 2, wherein the bottom wall of the liner comprises a hole formed therethrough to permit venting of the socket when the liner is inserted in the socket.

4. The housing of claim 3, comprising a sealant disposed in the hole.

5. The housing of claim 1, wherein the liner material is steel.

6. The housing of claim 1, wherein the liner material is an aluminum-based material.

7. The housing of claim 1, comprising a flange extending outwardly from and being in sealing engagement with an upper portion of the peripheral side wall.

8. The housing of claim 7, wherein the peripheral side wall, the bottom wall and the flange have a unitary construction.

9. An assembly useful for mounting an engine to an aircraft structure, the assembly comprising:
a body configured to be secured to the engine, the body being made of a magnesium-based material and defining a socket formed therein; and
a liner disposed in the socket for receiving and interfacing with an engine mounting element of the aircraft, the liner comprising a peripheral side wall and a bottom wall having an outer periphery in sealing engagement with a lower portion of the peripheral side wall, the liner being made of a liner material that provides a galvanic potential between the liner material and a material of the engine mounting element that is lower than a galvanic potential between the magnesium-based material of the body and the material of the engine mounting element.

10. The assembly of claim 9, comprising an interference fit between the liner and the socket.

11. The assembly of claim 10, wherein the bottom wall of the liner comprises a hole formed therethrough to permit venting of the socket when the liner is inserted in the socket.

12. The assembly of claim 11, comprising a sealant disposed in the hole.

13. The assembly of claim 9, wherein the liner material is steel.

14. The assembly of claim 9, wherein the liner material is an aluminum-based material.

15. The assembly of claim 9, comprising a flange extending outwardly from and being in sealing engagement with an upper portion of the peripheral side wall.

16. A method of manufacturing a housing of an aircraft engine where the housing is configured to interface with an engine mounting element of an aircraft, the method comprising:
receiving a housing body made of a magnesium-based material, the housing body defining a mounting pad comprising a socket; and
inserting a liner in the socket of the mounting pad for receiving and interfacing with the engine mounting element of the aircraft, the liner comprising a peripheral side wall and a bottom wall having an outer periphery in sealing engagement with a lower portion of the peripheral side wall.

17. The method of claim 16, wherein the liner is made of a liner material that provides a galvanic potential between the liner material and a material of the engine mounting element that is lower than a galvanic potential between the magnesium-based material of the housing body and the material of the engine mounting element.

18. The method of claim 16, comprising inserting the liner in the socket using an interference fit.

19. The method of claim 18, comprising forming a venting hole in the bottom wall prior to inserting the liner in the socket.

20. The method of claim 19, comprising sealing the hole after inserting the liner in the socket.

\* \* \* \* \*